(No Model.) 3 Sheets—Sheet 2.
G. E. HEATH.
SEED PLANTER.
No. 551,187. Patented Dec. 10, 1895.
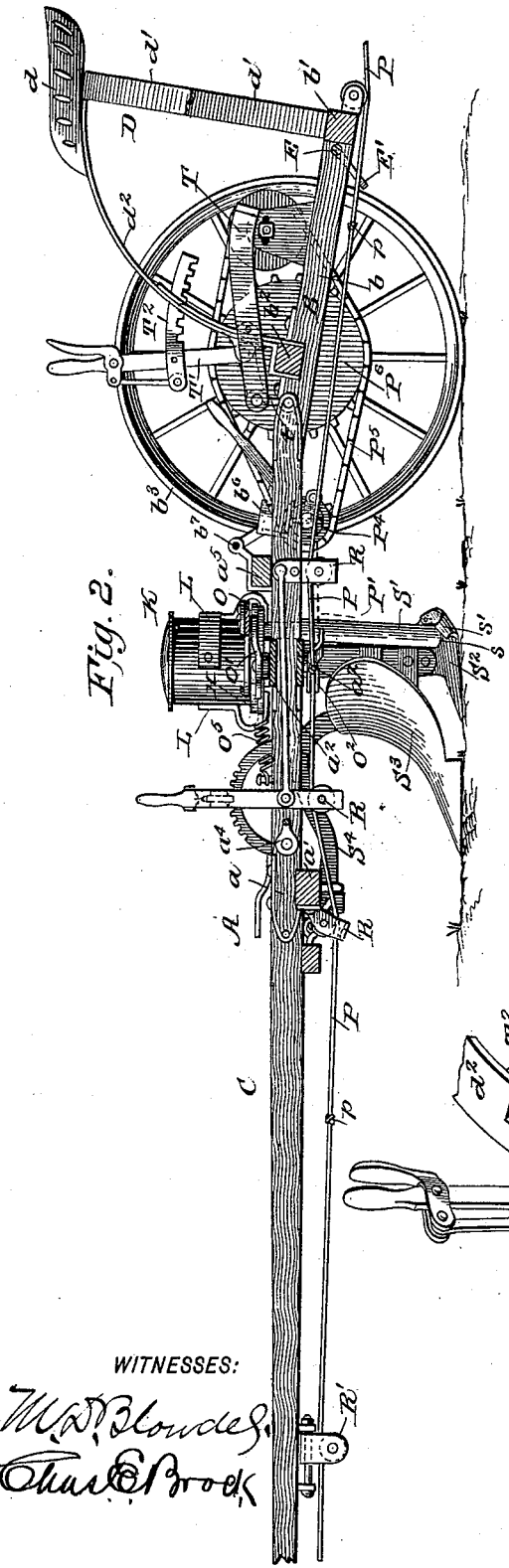
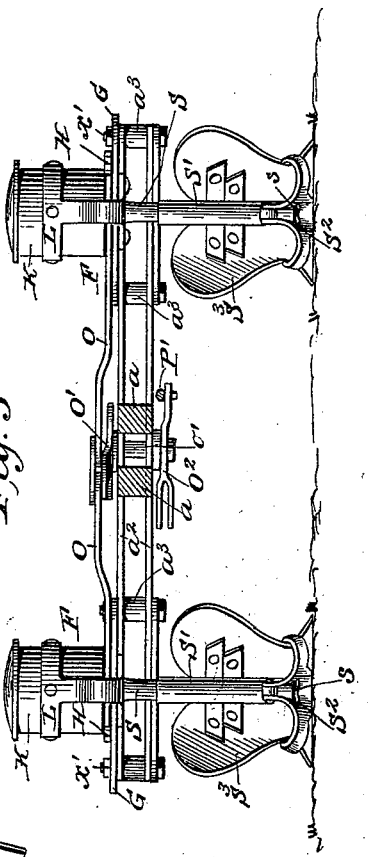
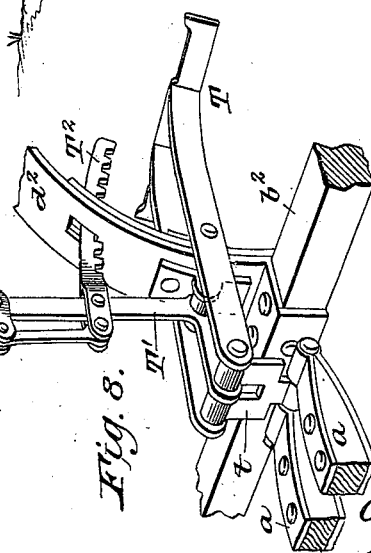
WITNESSES:
INVENTOR
G. E. Heath.
BY
ATTORNEYS

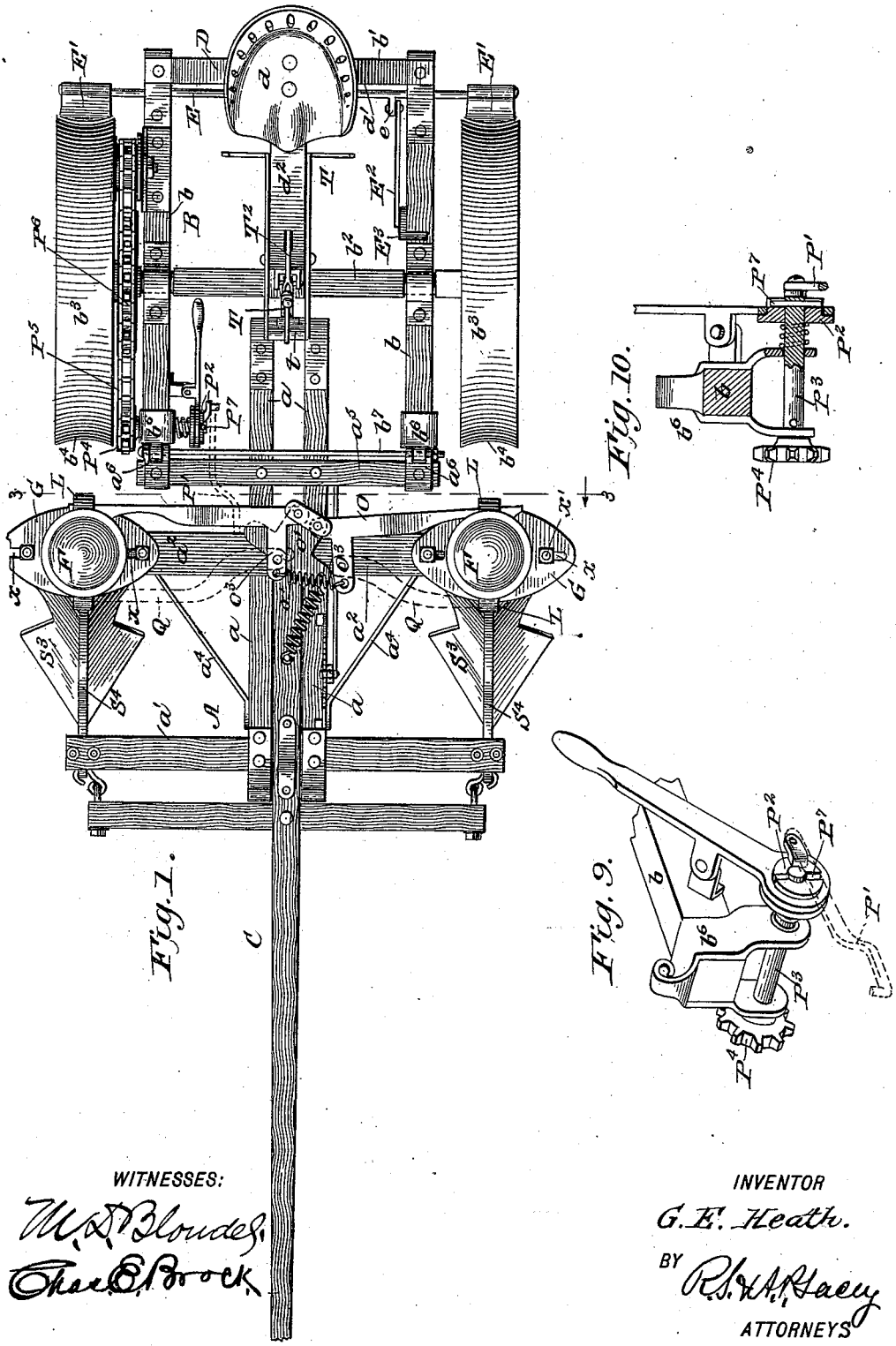

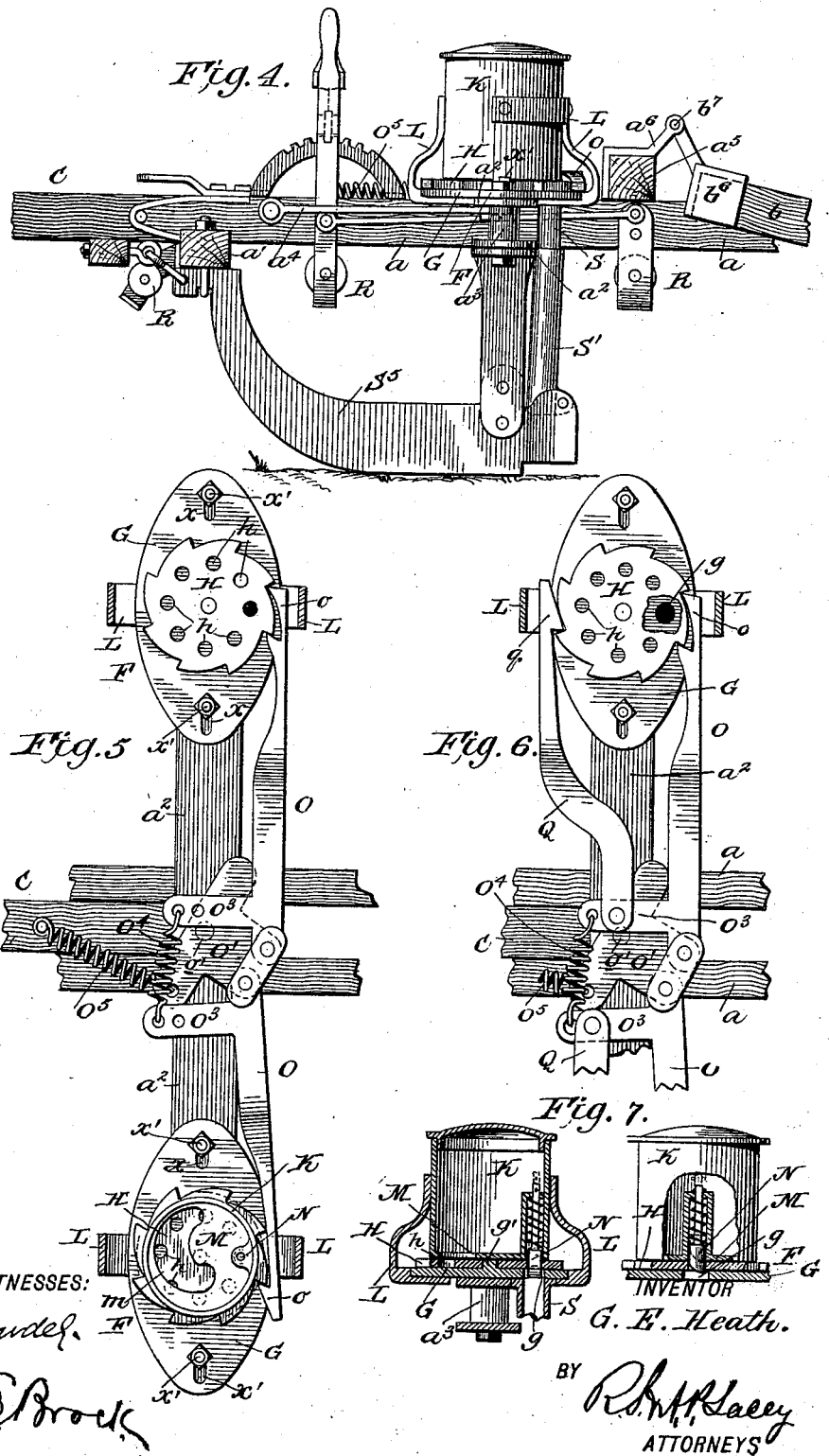

UNITED STATES PATENT OFFICE.

GEORGE E. HEATH, OF CURTIS, NEBRASKA.

SEED-PLANTER.

SPECIFICATION forming part of Letters Patent No. 551,187, dated December 10, 1895.

Application filed December 8, 1894. Serial No. 531,261. (No model.)

*To all whom it may concern:*

Be it known that I, GEORGE E. HEATH, a citizen of the United States, residing at Curtis, in the county of Frontier, State of Nebraska, have invented certain new and useful Improvements in a Combined Planter and Grain-Drill; and I do hereby declare the following to be a full, clear, and exact description of the invention, such as will enable others skilled in the art to which it appertains to make and use the same.

This invention is a combined planter and grain-drill, and is also provided with lister and subsoil attachments.

When the machine is used as a planter, I use a check-row attachment, but dispense with the same when using the machine for drilling, and the listing-plows are also removed when drilling. My invention is, therefore, a double-row listing corn-planter, with check-row attachments and capable of being converted into a grain-drill or seeder.

The objects of my invention are, first, to provide a double-listing corn-planter; secondly, to provide a check-row listing-planter, so that the corn can be worked both ways; thirdly, to provide a novel form of seed box or hopper, with means for feeding the grain therefrom; fourthly, a novel means for operating the seed-plate and means whereby the planter can be readily transformed into a drill; and, lastly, to provide an improved means for raising and lowering the plows.

With these objects in view my invention consists in the peculiar construction of the various parts, and also in the novel manner of combining the said parts, all of which parts and combinations will be fully described, and then pointed out in the claim hereto annexed.

In the drawings forming a part of this specification, Figure 1 is a top plan view. Fig. 2 is a longitudinal section. Fig. 3 is a transverse section on line 3 3 of Fig. 1. Fig. 4 is a detail side view of the front frame. Fig. 5 is a plan view of the feed-operating devices with one seed-box removed. Fig. 6 is a similar view of one half the feed-operating mechanism used in drilling. Fig. 7 shows the feed-box. Figs. 8, 9, and 10 are detail views.

In constructing a machine in accordance with my invention, I employ a main frame composed of the front and rear sections A and B, respectively. The front section consists of two longitudinal beams $a\,a$, arranged close together and between them is arranged the tongue C. A cross-beam $a'$ is secured to the beams $a$ at their forward ends, and near the center of the beams $a$ are secured the central cross-beams $a^2\,a^2$, one above and the other below the beams $a$, and bolted together at $a^3$, brace-arms $a^4\,a^4$ extending from said bolts to the sides of the beams A. A rear cross-bar $a^5$ is secured upon the top of the beams $a$, near their rear ends, said beams carrying hinge-castings $a^6$ at the ends, which are connected with similar castings $b^6$ upon the rear frame by means of a rod $b^7$, whereby the front and rear frames are connected by a hinge-joint. The rear frame consists of the side beams $b\,b$, the rear beam $b'$, and the axle or central beam $b^2$, carrying wheels $b^3$ on its ends, the peripheries of said wheels being concaved. A seat-frame D is attached to the rear frame and carries a driver's seat $d$, said frame being constructed of two oblique supports $d'$, connected to the rear cross-beam $b'$, and the curved bar $d^2$, attached to the rear side of the axle.

A beam E is journaled in the side beams $b$, near their rear ends, and carries scrapers E' at its outer ends to scrape the wheels, said beam having an arm $e$ thereon, to which is connected a rod $E^2$, operated by a foot-lever $E^3$, pivoted to the side beam $b$, near the axle. This foot-lever is within reach of the driver, so that by depressing the lever the wheels can be scraped at any time.

Seed-boxes F F are arranged at the ends of the central beam $a^2$, said seed-box being constructed with a bottom plate G, having an opening $g$, through which the grain passes to the delivery-chute hereinafter specified, and at the center of this plate is fixed a stud $g'$ to center the feed-disk H, which rests on the bottom plate and is provided with a series of holes $h$, to receive the seed or grain, and has a ratcheted periphery for the purpose hereinafter explained.

The box or hopper proper consists of a cylinder K, held between arms L L, which extend upward from the bottom plate, and embrace the sides of the cylinder. This box carries a cut-off M in the bottom, consisting of a plate having an ogee-shaped opening $m$ therein to permit the seed or grain to enter the holes $h$ in the feed-disk, and arranged also within the box is a spring-actuated plunger N, which serves to force the seed from the disk-holes into the chute, and this plunger also acts to hold the disk in place until operated as now explained.

To operate the disks, I employ two arms O O, having pawls $o$ $o$ at their outer ends, to engage the ratchet-teeth of the feed-disks, the inner ends of said arms being pivotally connected to a T-shaped lever O', pivoted upon the central beam $a^2$, the pivotal bolt $o'$ extending through said beam or beams, and carrying a lever $o^2$ upon its lower end. The arms O O are also formed with offsets $O^3$ at their inner ends, said offsets being connected by means of a spiral spring $O^4$, which tends to throw said arms to their normal positions. A spiral spring $O^5$ is also connected to one end of the T-shaped lever O', which also brings said arms back to their normal position. As the arms move from side to side the pawls engage the ratchets of the feed-disk and move them around step by step, and feed the seed or grain to the delivery-chute. The cut-off regulates the amount each hole carries, and as the disk moves around the ejector forces the grain into the chute. This ejector normally locks the disk in place, but the power of the operating-arm is always sufficient to overcome the spring of this ejector. The lever $o^2$ is pivoted centrally, and one of its ends is split to receive the check-wire P, carrying knobs $p$, which engage the lever and operate the same. The opposite end of the lever $O^2$ is connected with a pitman P', which in turn is connected with a crank-disk $P^2$, mounted upon the end of a shaft $P^3$, journaled in a bracket upon the bottom of one of the side beams of the rear frame. This shaft $P^3$ carries a sprocket $P^4$, over which passes a drive-chain $P^5$, which receives its motion from a larger sprocket $P^6$, connected with one of the drive-wheels. A suitable clutch mechanism $P^7$ is arranged upon the shaft $P^3$, by means of which the crank-disk can be thrown into or out of gear.

The drive-chain, sprockets, pitman, &c., are employed only when the machine is drilling, and at this time I also attach an extra operating-arm Q to each seed-box, so as to operate twice as rapidly as a single arm. These arms Q are pivoted to the offset ends of the main arms and carry pawls $q$ at their ends to engage the ratchets. These arms are used only in drilling, and are removed when the check-row attachment is employed.

The check-wire runs through guides R R, attached to the bottom of frame at the center, said guides being open at one side to permit the withdrawal of the wire at any time, and the guide R', attached to the tongue, is detachable to permit the wire to be dropped when it is desired to turn the machine at the end of a row.

S indicates the delivery-chute depending from the bottom plate of the seed-box, and depending from the ends of the beam $a^2$ are the standards S', to which are attached the subsoilers $S^2$, and also the listers $S^3$, said listers having beams $S^4$, which connect at their forward ends to the under side of the beam $a'$. The lister and subsoiler can be easily removed from the standards and a shoe or furrow-opener $S^5$ substituted when the machine is used for drilling.

The subsoiler is of peculiar formation, having an opening $s$, to permit the seed to pass, and upwardly and forwardly curved wings $s'$, which turn the earth over the seed after it is planted.

The seed-boxes are made adjustable laterally by having a slot $x$ in the bottom plate, and a bolt $x'$, passing therethrough and securing the plate to the beam $a^2$.

In order to raise and lower the furrow-openers, I connect the rear ends of the beams $a$ $a$ with a foot-lever frame T, pivoted upon the arched seat-support and connected at its forward end to the beams $a$, by means of a link $t$. An elbow hand-lever T' is also connected to said link and foot-lever frame, said lever carrying a toothed bar $T^2$, which passes through the arched seat-support and holds the foot-lever frame locked in either a raised or lowered position.

Whenever it is desired to set the furrowers in the ground, the hand-lever is thrown forward, and when it is desired to raise the furrowers, as at the end of a row, the foot-lever is depressed, the hand-lever thrown back and the forward frame elevated.

The operation of my improved machine is apparent to every one skilled in husbandry, and it will be seen that I produce a machine which will plant and list two rows of corn at once. It will also be noticed that the machine can be changed from a planter to a drill, and it will also be noticed that I provide novel forms of seed-boxes, operating mechanisms, and supporting-frames.

Having thus described my invention, what I claim, and desire to secure by Letters Patent, is—

The combination, with the seed boxes, and ratchet faced drop plates, the arms O, having offset portions $O^3$, the T-shaped lever O', connected to the arms O, and the springs $O^4$ and $O^5$ for connecting the offsets $O^3$ to each other, and to the main frame, substantially as shown and described.

In testimony whereof I affix my signature in presence of two witnesses.

GEORGE E. HEATH.

Witnesses:
   JOHN W. STRAIGHT,
   S. H. ROBINSON.